(12) United States Patent
McNicholas

(10) Patent No.: US 8,156,037 B2
(45) Date of Patent: *Apr. 10, 2012

(54) REGULATING ORDER ENTRY IN AN ELECTRONIC TRADING ENVIRONMENT TO MAINTAIN AN ACTUAL COST FOR A TRADING STRATEGY

(75) Inventor: Daniel T. McNicholas, Orland Park, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,524

(22) Filed: Jun. 24, 2011

(65) Prior Publication Data

US 2011/0258105 A1    Oct. 20, 2011

Related U.S. Application Data

(63) Continuation of application No. 12/687,857, filed on Jan. 14, 2010, now Pat. No. 7,996,300, which is a continuation of application No. 11/482,625, filed on Jul. 7, 2006, now Pat. No. 7,672,898.

(51) Int. Cl.
  *G06Q 40/00* (2006.01)
(52) U.S. Cl. ......................................................... 705/37
(58) Field of Classification Search .................. None
  See application file for complete search history.

(56) References Cited

U.S. PATENT DOCUMENTS

| | | | |
|---|---|---|---|
| 4,412,287 A | 10/1983 | Braddock, III | |
| 4,588,192 A | 5/1986 | Laborde | |
| 4,674,044 A | 6/1987 | Kalmus et al. | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |

(Continued)

FOREIGN PATENT DOCUMENTS

EP    1 067 471 A1    1/2001

(Continued)

OTHER PUBLICATIONS

McInish et al., "An Analysis of Intraday Patterns in BidAsk Spreads for NYSE Stocks," The Journal of Finance, vol. 47, No. 2 (Jun. 1992), pp. 753-764.

(Continued)

*Primary Examiner* — Jason M Borlinghaus
(74) *Attorney, Agent, or Firm* — McDonnell Boehnen Hulbert & Berghoff LLP

(57) ABSTRACT

A system and method for regulating order entry based on an acceptable slop range for a trading strategy are described. According to one example embodiment, a trader may define an acceptable slop range for a trading strategy as a percentage. The trader may also define a variable to associate with the trading strategy. Using a spread trading algorithm, a spread price axis is generated and the trader may place an order for the trading strategy at a desired price, comprising placing an order in one leg market dependent on the market conditions of another leg market. Using the acceptable slop range, the system keep the net cost to the trader within the acceptable slop range, by regulating orders in the leg markets. Defining an acceptable slop range as a percentage allows the trader to monitor and regulate their profits and loss, regardless of the type of spread trading algorithm used or the placement of an order on the spread price axis.

22 Claims, 6 Drawing Sheets

U.S. PATENT DOCUMENTS

| | | |
|---|---|---|
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |
| 5,689,651 A | 11/1997 | Lozman |
| 5,701,427 A | 12/1997 | Lathrop |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,806,050 A | 9/1998 | Shinn et al. |
| 5,819,238 A | 10/1998 | Fernholz |
| 5,845,266 A | 12/1998 | Lupien et al. |
| 5,903,478 A | 5/1999 | Fintel et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,926,801 A | 7/1999 | Matsubara et al. |
| 5,946,667 A | 8/1999 | Tull, Jr. et al. |
| 5,963,923 A | 10/1999 | Garber |
| 6,012,046 A | 1/2000 | Lupien et al. |
| 6,014,643 A | 1/2000 | Minton |
| 6,016,483 A | 1/2000 | Rickard et al. |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,191,799 B1 | 2/2001 | Purdy |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,400,996 B1 | 6/2002 | Hoffberg et al. |
| 6,408,282 B1 | 6/2002 | Buist |
| 6,418,419 B1 | 7/2002 | Nieboer et al. |
| 6,493,682 B1 | 12/2002 | Horrigan et al. |
| 6,519,574 B1 | 2/2003 | Wilton et al. |
| 6,766,304 B2 | 7/2004 | Kemp, II et al. |
| 6,912,511 B1 | 6/2005 | Eliezer et al. |
| 6,915,301 B2 | 7/2005 | Hirsch |
| 6,963,856 B2 | 11/2005 | Lutnick et al. |
| 6,996,540 B1 | 2/2006 | May |
| 7,076,452 B2 | 7/2006 | Florance et al. |
| 7,082,398 B1 | 7/2006 | Apple et al. |
| 7,110,974 B1 | 9/2006 | Rust |
| 7,171,386 B1 | 1/2007 | Raykhman |
| 7,177,833 B1 | 2/2007 | Marynowski et al. |
| 7,181,405 B1 | 2/2007 | Sako |
| 7,219,076 B1 | 5/2007 | Racine |
| 7,225,153 B2 | 5/2007 | Lange |
| 7,251,629 B1 | 7/2007 | Marynowski et al. |
| 7,299,208 B1 | 11/2007 | Bailon et al. |
| 7,437,325 B2 | 10/2008 | Kemp, II et al. |
| 7,590,576 B1 | 9/2009 | Zagara et al. |
| 7,672,898 B1 | 3/2010 | McNicholas |
| 7,904,370 B2 | 3/2011 | Singer et al. |
| 2001/0042040 A1 | 11/2001 | Keith |
| 2001/0044770 A1 | 11/2001 | Keith |
| 2001/0049651 A1 | 12/2001 | Selleck |
| 2001/0051919 A1 | 12/2001 | Mason |
| 2002/0023038 A1 | 2/2002 | Fritsch et al. |
| 2002/0046146 A1 | 4/2002 | Otero et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otero et al. |
| 2002/0055899 A1 | 5/2002 | Williams |
| 2002/0059129 A1 | 5/2002 | Kemp, II et al. |
| 2002/0091617 A1 | 7/2002 | Keith |
| 2002/0099644 A1 | 7/2002 | Kemp, II et al. |
| 2002/0128950 A1 | 9/2002 | Wu et al. |
| 2002/0138401 A1 | 9/2002 | Allen et al. |
| 2002/0151992 A1 | 10/2002 | Hoffberg et al. |
| 2002/0169703 A1 | 11/2002 | Lutnick et al. |
| 2002/0178104 A1 | 11/2002 | Hausman |
| 2002/0188555 A1 | 12/2002 | Lawrence |
| 2002/0194114 A1 | 12/2002 | Erdmier |
| 2002/0194115 A1* | 12/2002 | Nordlicht et al. ............... 705/37 |
| 2003/0004852 A1 | 1/2003 | Burns |
| 2003/0004853 A1 | 1/2003 | Ram et al. |
| 2003/0009411 A1 | 1/2003 | Ram et al. |
| 2003/0014351 A1 | 1/2003 | Neff et al. |
| 2003/0023542 A1 | 1/2003 | Kemp, II et al. |
| 2003/0033235 A1 | 2/2003 | Hummelgren |
| 2003/0069830 A1 | 4/2003 | Morano et al. |
| 2003/0083941 A1 | 5/2003 | Moran et al. |
| 2003/0101125 A1 | 5/2003 | McGill et al. |
| 2003/0130929 A1 | 7/2003 | Waddell |
| 2003/0149636 A1 | 8/2003 | Lutnick et al. |
| 2003/0154152 A1 | 8/2003 | Gilbert et al. |
| 2003/0195822 A1 | 10/2003 | Tatge et al. |
| 2003/0200167 A1 | 10/2003 | Kemp, II et al. |
| 2004/0103127 A1 | 5/2004 | Bjornson et al. |
| 2004/0230493 A1 | 11/2004 | Tatge et al. |
| 2004/0236637 A1 | 11/2004 | Tatge et al. |
| 2005/0154668 A1 | 7/2005 | Burns |
| 2005/0203826 A1 | 9/2005 | Farrell et al. |
| 2006/0015375 A1 | 1/2006 | Lee et al. |
| 2006/0259406 A1 | 11/2006 | Kemp |
| 2006/0259409 A1 | 11/2006 | Burns |
| 2006/0259412 A1 | 11/2006 | Kemp, II et al. |
| 2006/0259414 A1 | 11/2006 | Singer |
| 2006/0265314 A1 | 11/2006 | Singer |
| 2008/0288390 A1 | 11/2008 | Maynard |

FOREIGN PATENT DOCUMENTS

| | | | |
|---|---|---|---|
| EP | 1 104 904 A1 | 6/2001 | |
| EP | 1 217 564 A2 | 6/2002 | |
| EP | 1217564 A3 | 7/2002 | |
| EP | 1 246 111 A2 | 10/2002 | |
| WO | WO 91/14231 A1 | 9/1991 | |
| WO | WO 95/26005 A1 | 9/1995 | |
| WO | WO 98/49639 A1 | 11/1998 | |
| WO | WO 99/19821 A1 | 4/1999 | |
| WO | WO 99/30259 A1 | 6/1999 | |
| WO | WO 99/53424 A1 | 10/1999 | |
| WO | WO 00/48113 A1 | 8/2000 | |
| WO | WO 00/51043 A1 | 8/2000 | |
| WO | WO 00/52619 A1 | 8/2000 | |
| WO | WO 00/62187 A2 | 10/2000 | |
| WO | WO 00/62187 A3 | 10/2000 | |
| WO | WO 00/65510 A1 | 11/2000 | |
| WO | WO 01/16830 A1 | 3/2001 | |
| WO | WO 01/16852 A2 | 3/2001 | |
| WO | WO 01/22266 A2 | 3/2001 | |
| WO | WO 01/22315 A2 | 3/2001 | |
| WO | WO 01/22315 A3 | 3/2001 | |
| WO | WO 01/65403 A2 | 9/2001 | |
| WO | WO 01/88808 A1 | 11/2001 | |
| WO | WO 02/29686 A1 | 4/2002 | |
| WO | WO 02/33621 A1 | 4/2002 | |
| WO | WO 02/33623 A1 | 4/2002 | |
| WO | WO 02/33635 A1 | 4/2002 | |
| WO | WO 02/33636 A1 | 4/2002 | |
| WO | WO 02/33637 A1 | 4/2002 | |
| WO | WO 02/47006 A1 | 6/2002 | |
| WO | WO 02/079940 A2 | 10/2002 | |
| WO | WO 02/080433 A2 | 10/2002 | |
| WO | WO 02/097580 A2 | 12/2002 | |
| WO | WO 02/103601 A1 | 12/2002 | |
| WO | WO 03/077061 A2 | 9/2003 | |
| WO | WO 03/090032 A2 | 10/2003 | |
| WO | WO 03/090032 A3 | 10/2003 | |
| WO | WO 04/001653 A1 | 12/2003 | |
| WO | WO 2005/089495 A2 | 9/2005 | |

OTHER PUBLICATIONS

Clark et al., Dec. 1992 "Seasonalities in NYSE Bid-Ask Spreads and Stock Returns in January", the Journal of Finance, vol. 47, No. 5 (Dec. 1992) pp. 1999-2014.

George, et al., "Bid-Ask Spreads and Trading Activity in the S&P 100 Index Options Market," the Journal of Financial and Quantitative Analysis, vol. 28, No. 3 (Sep. 1993) pp. 381-397.

International Search Report and Written Opinion issued in PCT/US05/09180.

Kharouf, A Trading Room with a View, Futures, 27, 11—Nov. 1998. www.tradingtechnologies.com/products/xtrade_full.html (viewed May 22, 2001) Jun. 9, 2000.

International Search Report and Written Opinion for PCT/US05/09180.

USPTO Presentation Nov. 8, 2001.

* cited by examiner

REGULATING ORDER ENTRY IN AN ELECTRONIC TRADING ENVIRONMENT TO MAINTAIN AN ACTUAL COST FOR A TRADING STRATEGY

CROSS-REFERENCE TO RELATED APPLICATIONS

This application is a continuation of U.S. patent application Ser. No. 12/687,857 filed Jan. 14, 2010, now U.S. Pat. No. 7,996,300, which is a continuation of U.S. patent application Ser. No. 11/482,625 filed Jul. 7, 2006, now U.S. Pat. No. 7,672,898, entitled "Regulating Order Entry in an Electronic Trading Environment to Maintain an Actual Cost for a Trading Strategy," the contents of which are fully incorporated herein by reference.

FIELD OF INVENTION

The present invention is directed to electronic trading. More specifically, the present invention is directed towards regulating order entry in an electronic trading environment.

BACKGROUND

Traders often use automated trading tools to implement trading strategies that involve simultaneous trading of two or more tradeable objects. One such trading strategy is commonly referred to as spread trading. In general, spread trading is the buying and/or selling of one or more tradeable objects, the purpose of which is to capitalize on changes or movements in the relationships between the tradeable objects. The tradeable objects that are used to complete a spread are referred to as the outright markets or "legs" of the spread.

A commercially available software application that allows traders to electronically trade spreads is AutoSpreader™ from Trading Technologies International, Inc. Features of the AutoSpreader™ trading tool are disclosed in U.S. patent application Ser. No. 10/137,979, entitled, "System and Method for Performing Automatic Spread Trading," filed on May 3, 2002, the entire contents of which are incorporated herein by reference.

Using such a tool, a trader can input a price to buy or sell the spread, and the automated trading tool will automatically work orders in the legs to achieve, or attempt to achieve the trader's desired price for the spread. For instance, a trader might define buying a spread as buying in leg A and selling in leg B. So, according to that definition, if the trader inputs a desired price to buy the spread, the automated trading tool will place a buy order in leg A, based on the best guaranteed price that a sell order could be filled at in leg B. The instant that the order in leg A is filled, the automated trading tool submits a market sell order to leg B at the current best bid price.

As the market in leg B moves, the order in leg A may be re-priced to achieve the desired spread price. Re-pricing an order typically involves canceling the existing order and replacing it with a new order at another price. While effective for achieving a desired spread price, re-pricing the order can result in it being placed at the end of an order queue corresponding to the order's new price at the electronic exchange. If, the new order loses queue position, then it may increase the likelihood that the order will not get filled and the trading strategy will fail. Additionally, a fee is often charged by the electronic exchange for re-pricing the order.

A trading tool, known as "slop" is used to limit the frequency at which orders are re-priced in the leg of a spread. So long as the price for the spread is within an acceptable range of prices defined by slop, the trading application refrains from re-pricing the order. However, if the price for the spread moves outside of the acceptable range of prices, the trading application re-prices the leg order, such that the desired spread price can still be achieved. Slop is disclosed in U.S. patent application Ser. No. 10/137,979, entitled, "System and Method for Performing Automatic Spread Trading," filed on May 3, 2002. Additionally, slop is further described in U.S. patent application Ser. No. 10/403,333, entitled, "System and Method for Variably Regulating Order Entry in an Electronic Trading Environment", filed on Mar. 31, 2003, the entire contents of which are incorporated herein by reference.

There are a variety of different algorithms that can be used to trade spreads. One such spread trading algorithm is known as an implied spread. The implied spread calculates the spread prices by simply subtracting certain prices of one leg from certain prices of another leg. The implied spread prices are based on a cash value. Thus, the implied spread prices equate to the actual cost of the spread to the trader.

With slop, a spread can get filled at a price (within acceptable limits defined by slop) other than the desired spread price. The price the trader actually gets for the spread is referred to herein as the "actual spread price." The actual spread price is the price of the spread if the orders in the legs were filled at that moment in time. In implied spreads, the actual spread price is equal to the actual cost of the spread.

To illustrate the implied spread algorithm, let's assume a trader has defined a spread with a leg A and a leg B and a slop value of "1." A slop value of "1" correlates to keeping the actual spread price within "1" value above or below the desired spread price. The following examples illustrate that when using the implied spread algorithm, the difference between the actual cost of the spread and the desired cost of the spread remains within a consistent range, regardless of the desired spread price.

For example, to buy the spread at "4," the trading application will automatically place a buy order in leg A based on the current best bid price in leg B, with the purpose of buying leg A and selling leg B. Let's assume that the best bid price in leg B is currently at a price of "10," therefore to achieve the desired spread price of "4," an order is placed at a price of "14" in leg A. To determine the order price in leg A the following relationship is used:

Implied spread price=leg $A$ price–leg $B$ price

4=leg $A$ price–10 leg $A$ price=14

If the order in leg A gets filled at "14" and an offsetting order gets sent to leg B, and fills at "10," the actual spread price would be "4." Therefore, the actual cost of the spread is "4" and can be calculated as follows:

Actual spread cost=price bought in leg $A$–price sold in leg $B$

Actual spread cost=14–10

Actual spread cost=4

Based on a slop setting of "1", the trader is willing to buy the spread at prices of "3," "4," or "5." This means that the market in leg B can move between "9" and "11." If the market in leg B moved up to "11" and the leg orders were filled, the actual spread price would be "3." As such, the trader would have bought the spread for $1 less/unit of the spread than previously anticipated. If the market in leg B moved down to "9" and the leg orders were filled, the actual spread price would be "5." As such, the trader would have bought the spread for $1 more/unit of the spread than previously anticipated.

However, if the market in leg B moved up to "12," it would result in an actual spread price of "2," which is not within the acceptable slop range of "3" and "5." This would cause the order in leg A to re-price from "14" to "16" to maintain the desired spread price of "4."

In another example, the trader wishes to buy the spread at "10." Currently, the best bid in leg B is still at a price of "10," so an order would be placed at a price of "20" in leg A (e.g., 10=20−10). The actual cost of the spread would be "10."

Based on a slop setting of "1", the trader is willing to buy the spread at prices of "9," "10," or "11." This means that the market in leg B can move between "9" and "11." If the market in leg B moved up to "11" and the leg orders were filled, the actual spread price would be "9." As such, the trader would have bought the spread for $1 less/unit of the spread than previously anticipated. If the market in leg B moved down to "9" and the leg orders were filled, the actual spread price would be "11." As such, the trader would have bought the spread for $1 more/unit of the spread than previously anticipated.

However, if the market in leg B move up to "12," the actual spread price would be "8," which is not within the acceptable slop range. This actual spread price would cause the order in leg A to re-price to a price that would maintain the desired spread price of "10," which in this example would be a price of "22."

As shown by the previous examples, regardless of the desired spread price (e.g., a spread price of "4" and "10" were entered), when a leg price fluctuates, there is a directly correlation to the change in the cost of the spread. For instance, in the above examples, when the market in leg B moved "1" price level, it causes the actual spread price to change by "1" price level. This also means that the actual cost of the spread would change by $1 per unit.

To illustrate another spread trading algorithm, such as the divide spread algorithm, let's assume a trader has defined a spread with a leg A and a leg B and a slop value of "1." A slop value of "1" correlates to keeping the actual spread price within "1" value above or below the desired spread price. The following examples illustrate that when using the divide spread algorithm, the difference between the actual cost of the spread and the desired cost of the spread does not remain within a consistent range, regardless of the desired spread price. In fact, when using the divide spread algorithm, there is an inconsistent difference between the desired spread cost and the actual spread cost when the desired prices of the spread are different. To illustrate this concept, two separate spread orders will be entered into a divide spread window. As will be illustrated, the inconsistencies are due to the nature of the divide spread algorithm, where instead of:

desired spread price=leg $A$ price−leg $B$ price

The divide spread algorithm calculates:

desired spread price=leg $A$ price/leg $B$ price

For example, to buy the spread at "10," the trading application will automatically place a buy order in leg A based on the current best bid price in leg B, with the purpose of buying leg A and selling leg B. Let's assume that the best bid price in leg B is currently at a price of "10," therefore to achieve the desired spread price of "10," an order is placed at a price of "100" in leg A. To determine the order price in leg A the following relationship is used:

Divide spread price=leg $A$ price/leg $B$ price

10=leg $A$ price/10 leg $A$ price=100

If the order in leg A gets filled at "100 and an offsetting order get sent to leg B, and fills at "10," the actual spread price would be "10." Therefore, the actual cost of the spread is "90" and can be calculated as follows:

Actual spread cost=price bought in leg $A$−price bought in leg $B$

Actual spread cost=100−10

Actual spread cost=90

Based on a slop setting of "1", the trader is willing to buy the spread at prices of "9," "10," or "11." However, if the market in leg B moved down to a price of "11," it would result in an actual spread price of "9.09", which is between the acceptable slop range of "9" and "11." Therefore, if the order in leg B fills at a price "11," the actual cost of the spread will be $89, which results in the trader paying $1 less/unit of the spread. The calculation is as follows:

Actual spread cost=price bought in leg $A$−price sold in leg $B$

Actual spread cost=100−11

Actual spread cost=89

In another example, the trader wishes to buy the spread at "4". Currently the best bid in leg B is at a price of "10," so an order is placed at a price of "40" in leg A (e.g., 10=40/10). The actual cost of the spread would be "30" (e.g., 30=40−10).

Based on a slop setting of "1", the trader is willing to buy the spread at prices "3," "4," or "5." If leg B moves up to a price of "13," the actual spread price would still be between the acceptable slop range of "3" and "5." Therefore, if the order in leg B fills at a price of $13, the actual cost of the spread will be $27, which results in the trader paying $3 less/unit of the spread. The calculation is as follows:

Actual spread cost=price bought in leg $A$−price sold in leg $B$

Actual spread cost=40−13

Actual spread cost=27

As illustrated, applying the same slop functionality to different methods of spreads, can result in an inconsistent difference in actual spread cost and desired spread cost to the trader. Using the current slop functionality with an implied spread produces the expected results, while using current slop functionality with the divide spread produces unexpected and possibly costly results to the trader. As described above, when using an implied spread, regardless of desired spread price, the actual cost to the trader remains within $1 of the desired cost of the spread. However, when using a divide spread, regardless of the desired spread price, the actual cost of the spread inconsistently varies depending on the desired spread price.

Thus, it is desirable to offer trading tools that can assist a trader in applying the slop functionality to a variety of spread trading algorithms in an attempt to keep the actual cost to the trader consistently within the acceptable range.

SUMMARY

The trading tools described herein may be put to advantageous use in an electronic trading environment. By using any one or more of the trading tools, the difference in the actual cost compared to the desired cost may be kept within a tolerable difference.

The example embodiments include defining an acceptable slop range for a trading strategy as a percentage. The method also includes defining a condition to associate with the trading strategy, such as the market conditions or an actual spread price. Using the trading application, the trader can input a desired price to buy or sell the spread, comprising placing an order in one leg market dependent on the market conditions of another leg market. Regardless of the desired spread price to buy or sell the spread, the actual cost of the spread remains within a consistent tolerable difference from the desired cost of the spread remains consistent. The tolerable difference is defined as the difference in cost associated to the movements in the legs, before the leg order(s) are re-priced.

Additional features and advantages of the example embodiment will be set forth in the description that follows. The features and advantages of the example embodiment may be realized and obtained through the embodiments particularly pointed out in the appended claims. These and other features of the present embodiments will become more fully apparent from the following description and appended claims, or may be learned by the practice of the example embodiments as set forth hereinafter.

BRIEF DESCRIPTION OF DRAWINGS

Example embodiments are described herein with reference to the following drawings, in which.

DETAILED DESCRIPTION

Figure 1:
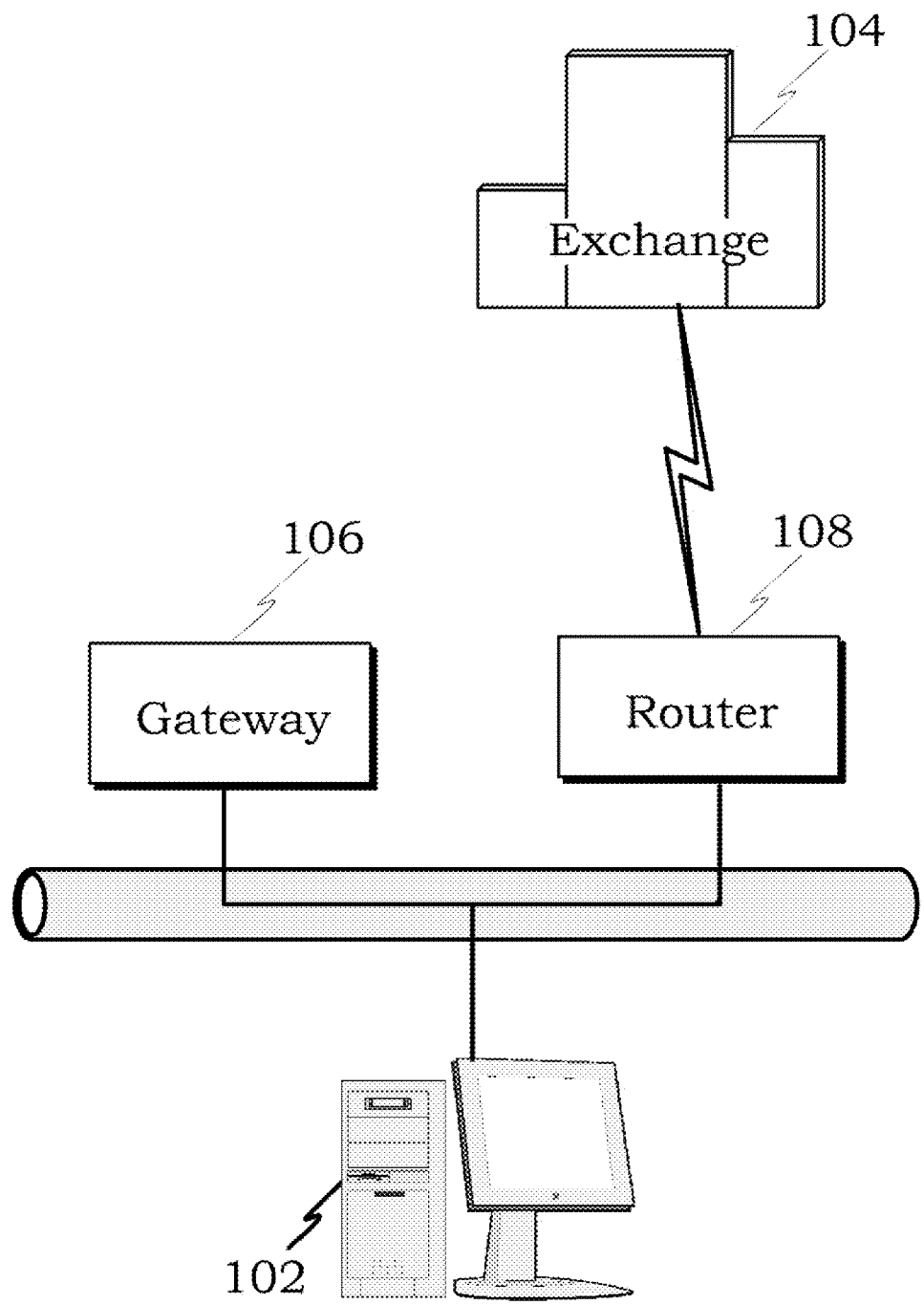
FIG. 1 is a block diagram illustrating a trading system for electronic trading according to an example embodiment, wherein the trading system includes a trading station where a trader can enter a desired price to buy or sell a spread.

The present embodiments build on the concepts of automatic spread trading, slop, and the visual representation of each. These concepts are described in U.S. patent application Ser. No. 10/137,979, entitled, "System and Method for Performing Automatic Spread Trading," filed on May 3, 2002, which describes methods used to automatically spread trade one or more tradeable objects simultaneously and the functionality referred to as slop, which limits the frequency at which orders are re-priced spread trading; U.S. patent application Ser. No. 10/403,333, entitled, "System and Method for Variably Regulating Order Entry in an Electronic Trading Environment", filed on Mar. 31, 2003, which further describes the concept of slop; and U.S. patent application Ser. No. 11/095,101, entitled, "Visual Representation and Configuration of Trading Strategies," filed on Mar. 31, 2005, which described methods of visually representing information pertaining to automatic spread trading and slop; the contents of each are incorporated by reference herein.

I. Overview

As previously illustrated, applying the same slop values to different methods of spread trading results in inconsistent differences between the actual spread cost and the desired spread cost to the trader. In an industry where profits and losses are the driving force behind most trades, inconsistencies cost the trader time, money, and energy in determining where to place orders.

When using a divide spread algorithm or a similar algorithm it is not guaranteed that the difference between the actual spread cost and the desired spread cost will remain constant, as it does in regards to the implied spread algorithm. The inconsistent price levels of the calculated divide spread make it nearly impossible to apply the conventional slop functionality. Unfortunately, for traders who want to use the divide spread algorithm or similar algorithm, not being able to apply slop functionally to their spreads such that the actual spread cost remains within a tolerable difference from the desired spread cost, can result in more re-pricing of orders, less than advantageous order queue location, more exchange related fees, and higher real costs to the trader. The divide spread algorithm is one example of a trading algorithm that would normally result in inconsistent cost differences to a trader. While the present invention is not limited for use with divide spreads, the divide spread algorithm is utilized to illustrate the example embodiments.

According to the example embodiments, slop is defined as a percentage to ensure that the actual cost of the spread remains within a tolerable difference from the desired cost of the spread. Applying slop as a percentage may produce the same difference between the actual spread cost and the desired spread cost to the trader regardless of where the desired spread order is placed.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

FIG. 1 is a block diagram illustrating an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the type of order execution algorithm used, the electronic exchange 104 provides market information to the subscribing trading station 102. Market information may include data that represents just the inside market. The inside market is the lowest sell price (best or lowest ask) and the highest buy price (best or highest bid) at a particular point in time. Market information may also include market depth. Market depth refers to quantities available at the inside market and can also refer to quantities available at other prices away from the inside market. Additionally, the electronic exchange can offer other types of market information such as the last traded price ("LTP"), or the last traded quantity ("LTQ").

The computer employed as the trading station 102 generally can range from a hand-held device, laptop, or personal computer to a larger computer such as a workstation and multiprocessor. Generally, the trading station 102 includes a monitor (or any other output device) and an input device, such as a keyboard and/or a two or three-button mouse to support click based trading, if so desired. One skilled in the art of computer systems will understand that the example embodiments are not limited to any particular class or model of computer employed for the trading station 302 and will be able to select an appropriate system.

The computer employed as the gateway 106 generally can range from a personal computer to a larger computer. Generally, the gateway 106 may additionally include a monitor (or any other output device), input device, and access to a database, if so desired. One skilled in the art of computer systems will also understand that the example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration.

III. A Second Example Trading System

Figure 2:
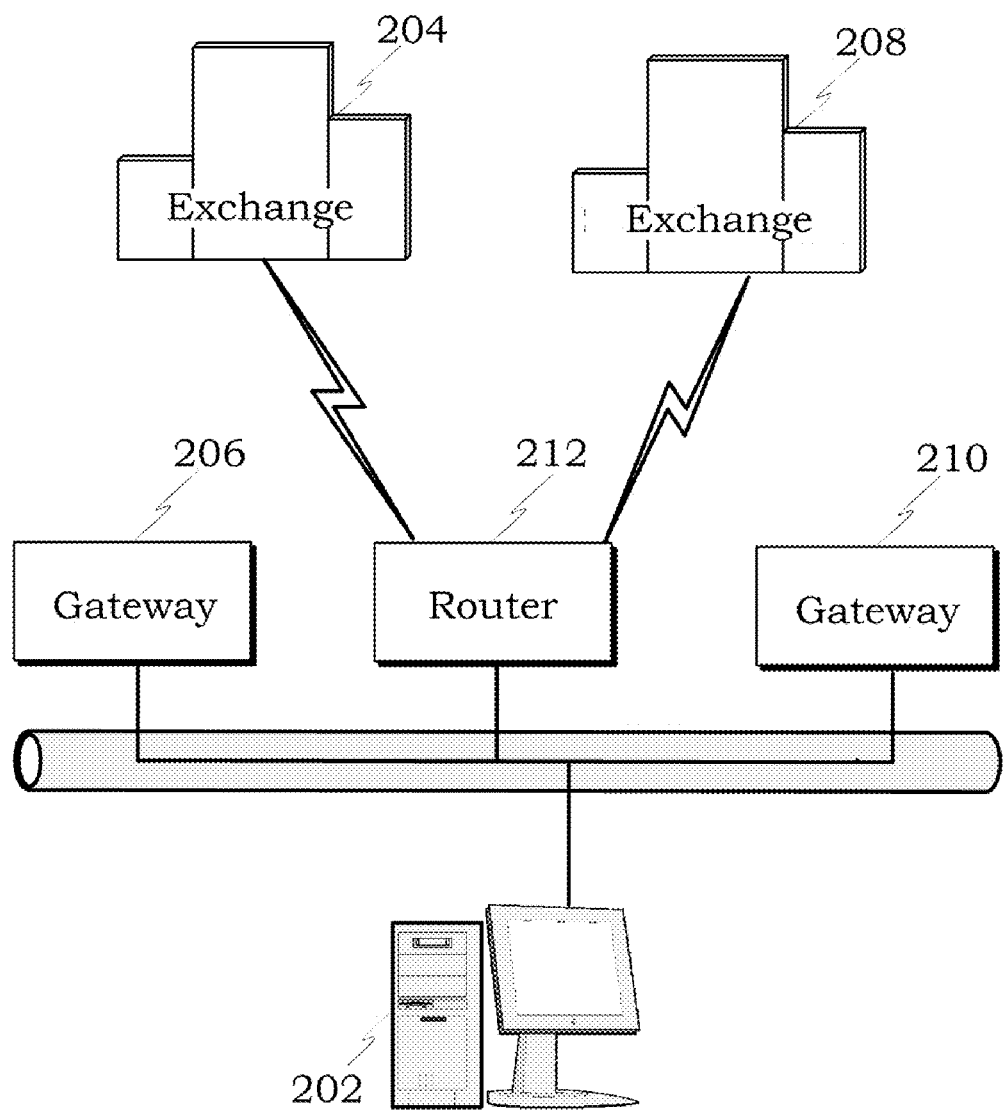
FIG. 2 is a block diagram illustrating another trading system for electronic trading according to another example embodiment, wherein the trading system includes a trading station where a trader can enter a desired price to buy or sell.

FIG. 2 is a block diagram illustrating another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to spread trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the example embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to access one or more electronic exchanges.

IV. An Example Trading System

Figure 3:
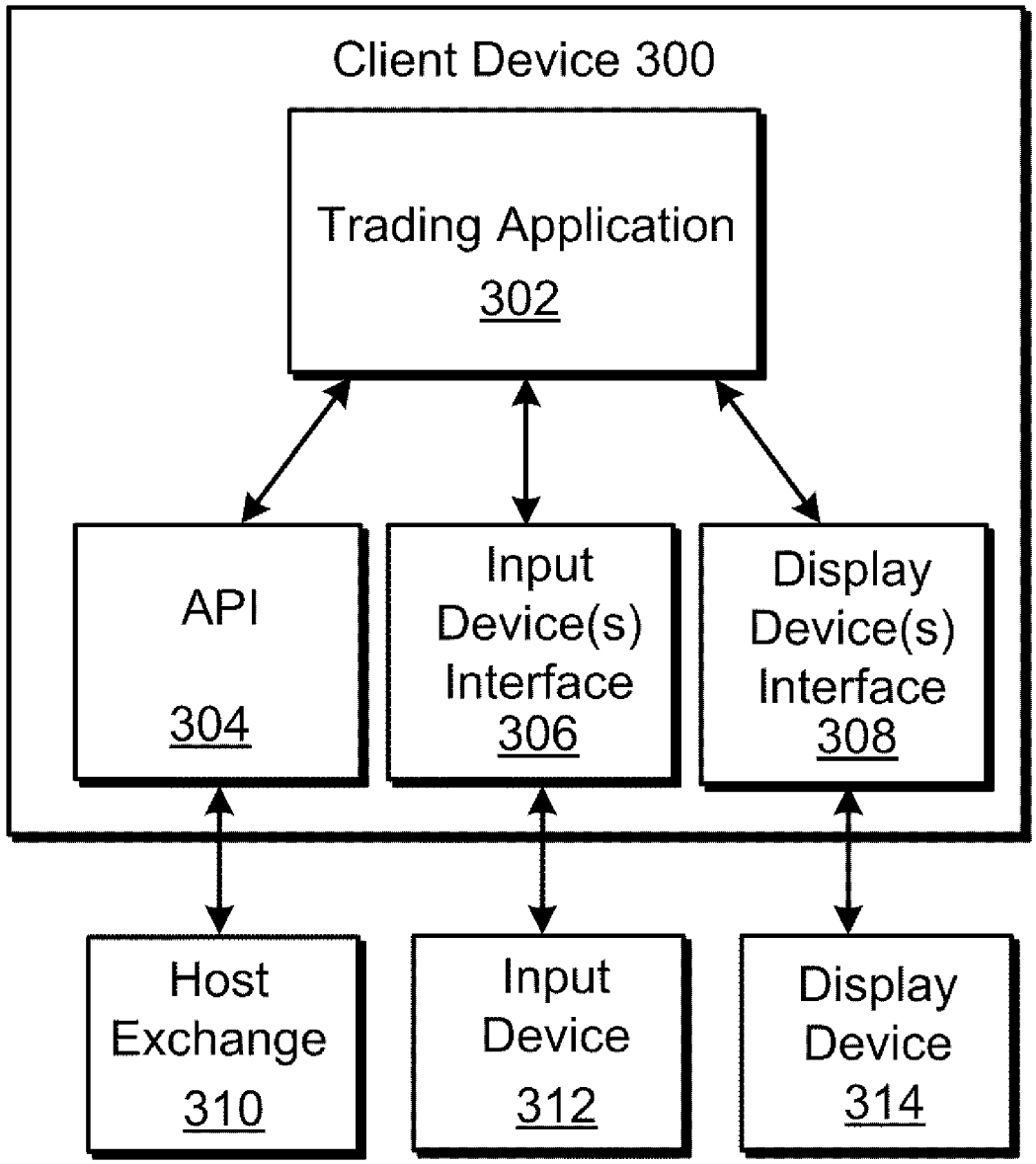
FIG. 3 is a block diagram illustrating an example trading station where a user can submit bids and offers for a spread.

FIG. 3 shows an overview of a trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread. Additionally, the example embodiments for regulating and managing order entry with the use of slop may be part of trading application 302.

Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway, or at the exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Automatic Spread Trading Overview

To assist in understanding how an automated spread trading tool might work, a general description is provided below. However, an automated spread trading tool and its functions are described in greater detail in U.S. patent application, Ser. No. 10/137,979, filed on May 3, 2002 and entitled, "System and Method for Performing Automatic Spread Trading," which has already been incorporated by reference.

The automated spread trading tool allows a trader to select two or more individual tradeable objects, "legs," to create a synthetic spread that is sometimes referred to as a spread. The automatic spread trading tool preferably generates a spread based on information in the legs and based on spread setting parameters, which may be configurable by a user.

As used herein, the term "tradeable object" refers to anything that can be traded with a quantity and price. For example, tradeable objects may include, but are not limited to, all types of traded financial products, such as, for example, stocks, options, bonds, futures, currency, and warrants, as well as funds, derivatives, and collections of the foregoing. Moreover, tradeable objects may include all types of commodities, such as grains, energy, and metals. Also, a tradeable object may be "real," such as products that are listed by an exchange for trading, or "synthetic," such as a combination of real products that is created by the trader (e.g. spread). A tradeable object could also be a combination of other tradeable objects, such as a class of tradeable objects or a trading strategy.

The spread data is communicated to a graphical user interface where it can be displayed in a spread window, and where data corresponding to the legs of the spread may be displayed as well. At the client terminal, the user can enter orders in the spread window, and the automated spread trading tool will automatically work orders in the legs to achieve, or attempt to achieve (because the fill of the order is not always guaranteed) a desired spread.

Figure 4:
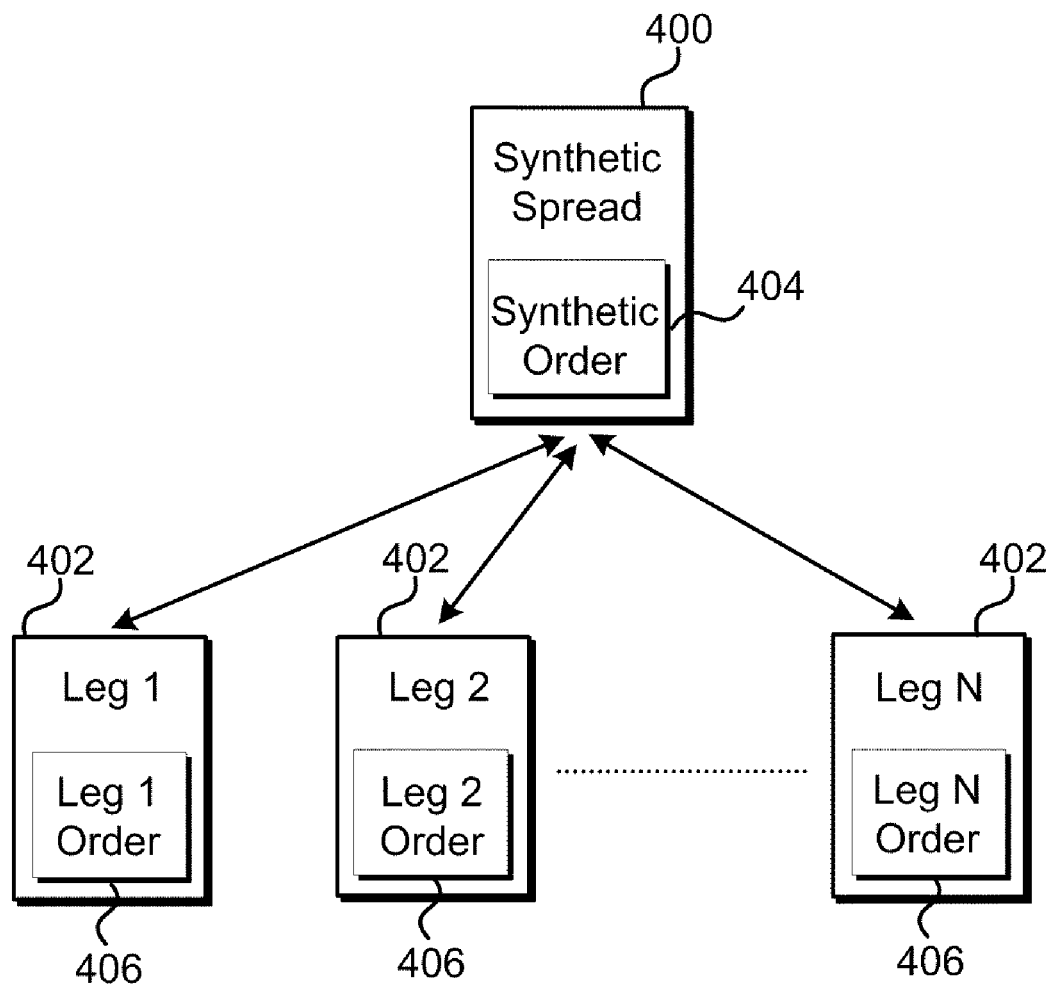
FIG. 4 is a block diagram illustrating the relationship between a spread, its underlying legs, and a synthetic spread order that has been placed.

FIG. 4 is a block diagram illustrating the relationship between a synthetically created spread 400, its underlying N legs 402, and a spread order 404 that has been entered. When a trader enters an order to buy or to sell the spread (e.g., represented as spread order 404) in a synthetic market, the automated spread trading tool automatically places orders in the appropriate legs to achieve or attempt to achieve the desired spread 404. For example, to achieve synthetic spread order 404, the automated spread trading tool may automatically enter orders 406, 408, 410 into the underlying legs 402. The automated spread trading tool may, among other things, calculate the quantities and prices for the orders 406, 408, 410 based on market conditions in the other legs and one or more parameters.

According to the example embodiments, as the market conditions for each leg move, an actual spread price may be calculated. As previously stated, the actual spread price is the price of the spread if the orders in the legs were filled at that moment in time. For example, if market conditions for "Leg 1" change, then an actual spread price associated with order 404 may be determined to reflect the new market conditions. Similarly, if market conditions for "Leg 2" change, then an actual spread price associated with order 404 may be determined. Using an automated spread trading tool, if the actual spread price is different from the desired spread price, then the automated spread trading tool would move or re-price the leg orders in an exchange order book to maintain the desired spread price. In particular, the leg order(s) would be deleted from the exchange(s), and new leg order(s) would be sent to the exchange to maintain the desired spread price.

According to the example embodiments, however, before actually moving or re-pricing the leg orders in the exchange order book, the example embodiments may determine whether it is necessary to move or re-price the leg orders. To determine if it is necessary, the desired spread price and the actual spread price are compared to determine if the actual spread price is outside of the acceptable slop range. In other words, the example embodiments limit the frequency at which the trading application moves or re-prices leg orders at the exchange based on an acceptable slop range.

Based on the concept of slop, if the actual spread price is within the acceptable slop range defined by the trader as a percentage, then the leg orders preferably do not move or get re-priced. If the actual spread price is outside of the acceptable slop range, then the leg orders are preferably moved or re-priced to maintain the desired spread price. It should be understood that slop could also be defined for each leg and the leg orders. For example, if the actual leg order price is not within an acceptable slop range from the leg order price then the leg orders are preferably moved or re-priced to the leg order in the exchange order book.

VI. Regulating Order Entry

Figure 5:
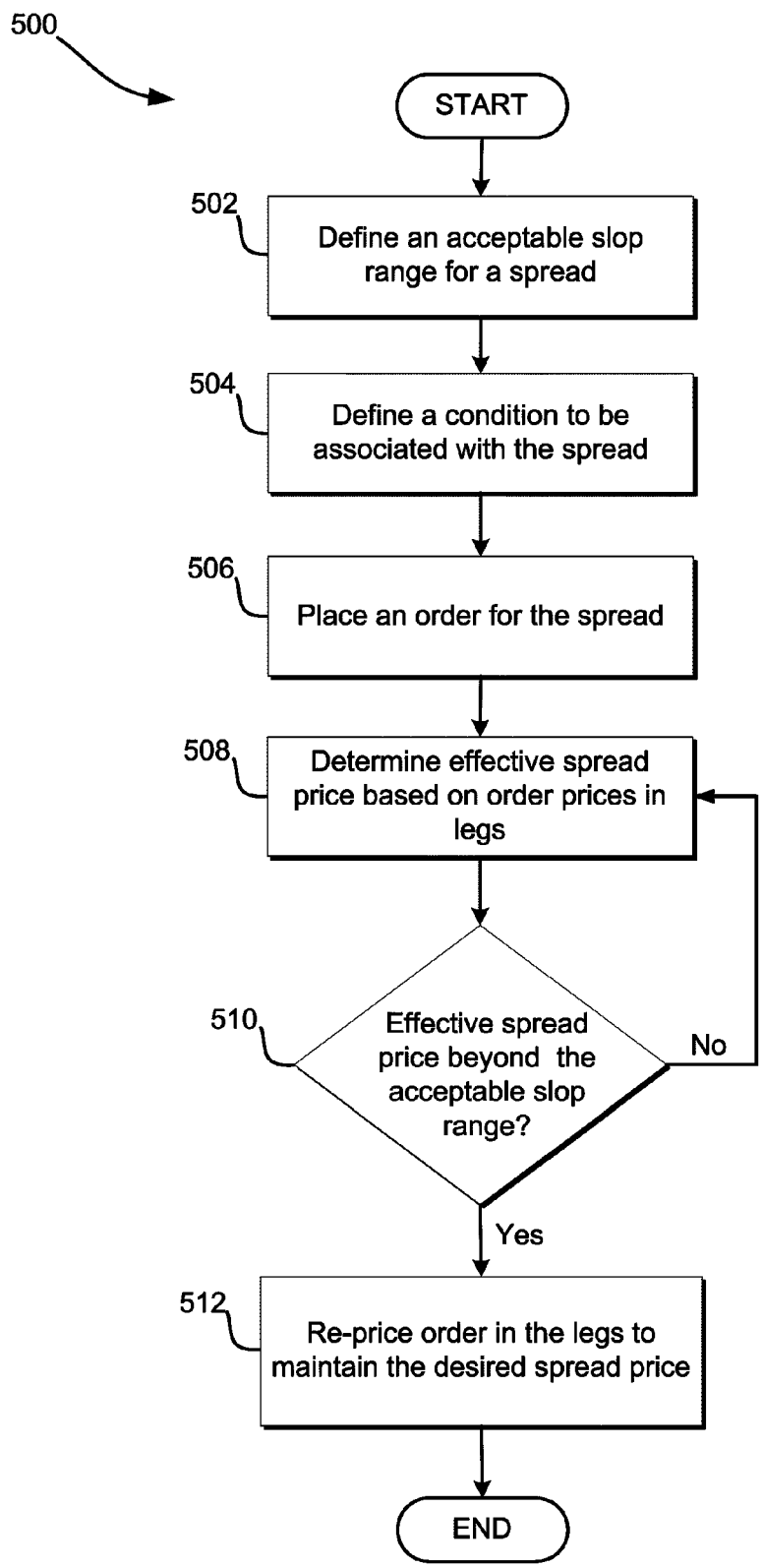
FIG. 5 is a flow chart illustrating an example method for applying slop according to the example embodiments.

FIG. 5 is a flow chart illustrating one example method 500 for regulating order entry based in an electronic trading environment based on an acceptable slop range for a spread. Also, it should be understood that the flow chart only shows the functionality and operation of a possible implementation of the present embodiments. In this regard, each block may represent a module, a segment, or a portion of the code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At 502, before the trading session begins, the trader initially defines the desired spread to trade. Then trader may define the acceptable slop range and the lowest acceptable price and the highest acceptable price. According to the example embodiments, the lowest acceptable price and the highest acceptable price, for which a trader is willing to buy or sell a spread, correspond to the acceptable slop range set by the trader. A slop value of "0" correlates to not using slop functionality at all and indicates that the legs will be re-quoted every time the market prices in the individual legs move. The larger the slop percentage, the larger the acceptable slop range will be. A larger slop percentage allows for more market fluctuation before the trading application re-prices the leg orders. In the following examples, we will assume the trader has defined the acceptable slop range as 20% above or below the desired spread price. It should be understood that the lowest acceptable price and the highest acceptable price could differ from each other.

At 504, a condition is associated with the desired spread price. Specifically, the condition is either the actual spread price or the market conditions. The trading application compares the change in the condition to the acceptable slop range when determining if the orders in the legs require re-pricing. For example, if the market conditions moved to outside the acceptable slop range then the leg order(s) may be re-priced. Similarly, if the actual spread price moved outside the acceptable slop range, then the leg order(s) may be re-priced. The following examples will use the actual spread price as the condition associated with the spread price.

At 506, a desired spread price (and quantity) can be entered. Using the graphical interface associated with the trading application, the trader can enter, delete, or modify orders. Upon setting a desired spread price, the trading application places an order in "leg A", based on the market conditions in "leg B". The trading application looks to the order in "leg A" and the market conditions in "leg B" to calculate the actual spread price. Due to constantly moving market conditions, it is possible that the actual spread price might differ from the desired spread price. Based on the example embodiments, if the actual spread price differs too much (or is outside the acceptable slop range) from the desired spread price, the leg orders may be re-priced to maintain the desired spread price and a keep the actual cost of the spread within a tolerable difference from the desired cost of the spread.

At 508, the trading application determines the acceptable slop range based on the defined percentage. To determine the acceptable slop range, the trading application may use the following relationships:

Lowest Acceptable Price: desired spread price*(100−slop)/100

Highest Acceptable Price: desired spread price*(100+slop)/100

At 510, based on previously determined acceptable slop range, the trading application compares the actual spread price to acceptable slop range. Based on the comparison, the trading application determines if the actual spread price is beyond the acceptable slop rage defined by the slop parameters. To determine if the actual spread price is beyond the acceptable slop range, the trading application uses the following comparison:

Lowest Acceptable Price<=Actual Spread Price<=Highest Acceptable Price

If the comparison is satisfied (true), then the actual spread price is within the acceptable slop range and the leg order(s) are not re-priced. The trading application would go back to step 508 and wait for another change in the actual spread price to determine if the leg orders should be re-priced. If the calculation is not satisfied (false), the actual spread price is not within the acceptable slop range. In this situation, at least one of the orders in the legs must be re-priced to maintain the desired spread price.

At 512 the actual spread price has been determined to be outside of the acceptable slop range, thus causing the leg orders to be re-priced by the trading application. The result of the leg orders being re-priced is the desired spread price is maintained by the trading application.

VIII. Example

Figure 6:
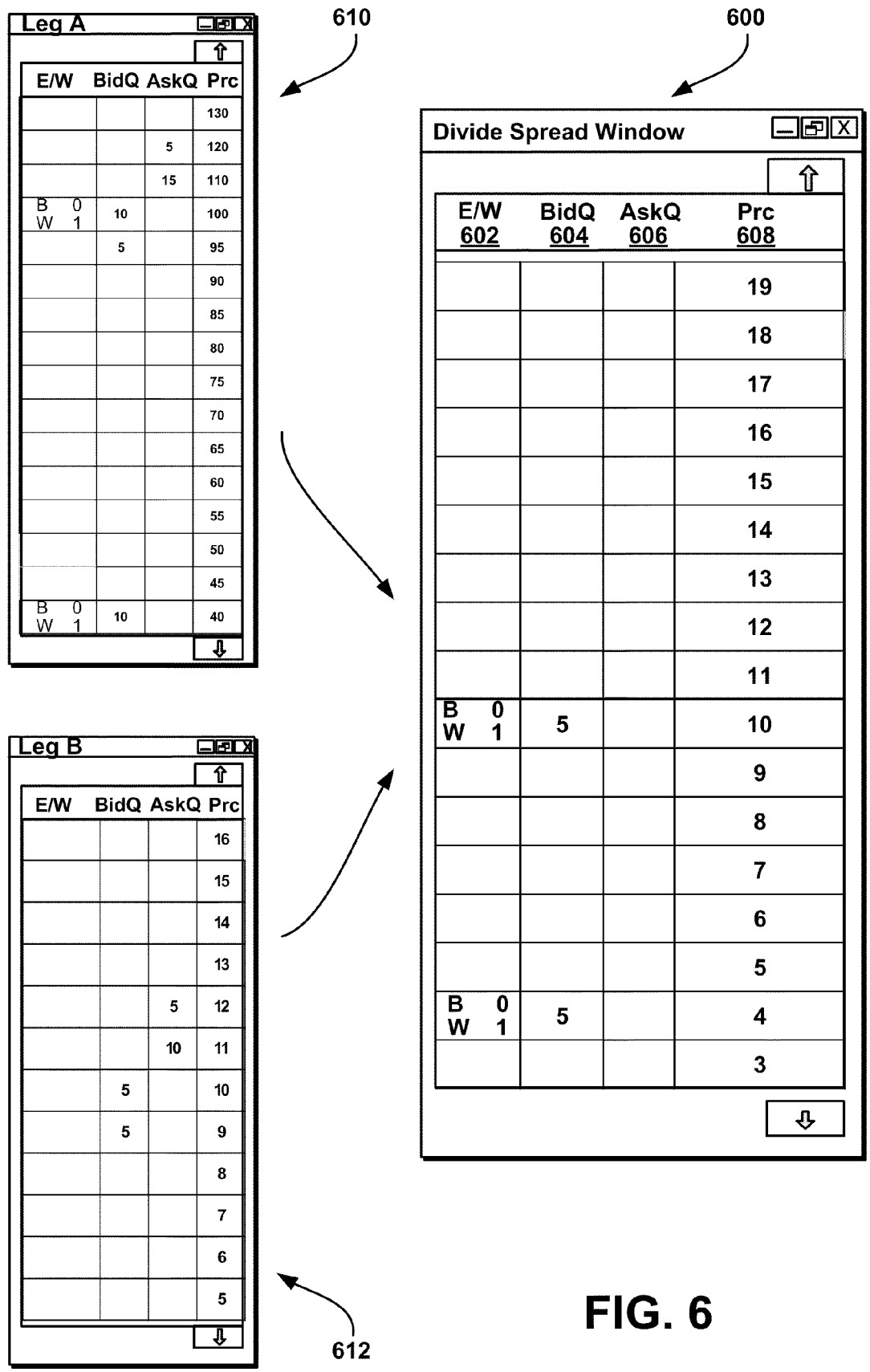
FIG. 6 is a block diagram illustrating an example spread trading screen based on the divide spread algorithm using slop defined as a percentage.

FIG. 6 is a block diagram illustrating an example spread trading screen based on the divide spread algorithm using slop defined as a percentage. Specifically, FIG. 6 includes a spread trading screen 600 containing a working quantity column 602, bid quantity column 604, ask quantity column 606, and price column 608. The working quantity column 602 displays desired orders to buy or sell the spread. The bid quantity column 604 displays buy order quantities available in relation to certain price levels in price column 608. The ask quantity column 606 displays offer order quantities available in relation to certain price levels in price column 608. FIG. 6 also displays trading screens for leg A 610 and leg B 612, which display the same columns as trading screen 700.

To illustrate the example embodiments, let's assume that slop has been defined as 20%. Specifically, a slop of 20% determines the trader is willing to accept a spread price of 20% above or below the desired spread price or an actual spread cost of +/−20%. As previously illustrated, when using conventional slop with a divide spread, the actual cost of the spread does not remain within a consistent tolerable difference from the desired cost of the spread, based on the price movements in the legs. However, when using slop defined as a percentage, the actual cost of the spread remains within a consistent tolerable difference from the desired cost of the spread, and regardless of where the spread order is placed, slop defined as a percentage keeps the leg prices from fluctuating such that the actual spread price is beyond the acceptable slop range.

The divide spread algorithm uses the following relationship to determine the spread price:

desired spread price=leg $A$ price/leg $B$ price

Based on the divide spread algorithm, to buy the spread at "10" along spread price column 608, the trading application will automatically place an order in leg A 610 based on the current best bid price in leg B, with the purpose of buying leg A and selling leg B. As shown in trading screen 612, the best bid price in leg B is currently at a price of "10," therefore to achieve the desired spread price of "10," an order is placed at a price of "100" in leg A 610. To determine the order price in leg A the following relationship is used:

desired spread price=leg $A$ price/leg $B$ price

10=leg $A$ price/10 leg $A$ price=100

In another embodiment, although the slop range is defined as 20%, the trading application may calculate the range so the trader knows the actual price values that fall within the 20% slop range. For example, to determine the acceptable slop range the trading application uses the following relationship:

Lowest Acceptable Spread Price=desired spread price*(100−slop)/100

8=10*(80/100)

Highest Acceptable Spread Price=desired spread price*(100+slop)/100

12=10*(120/100)

If the order in leg A gets filled at "100" and an offsetting order gets sent to leg B, and fills at "10," the actual spread price would be "10" (e.g., 10=100/10). Therefore the actual cost of the spread is "90" and can be calculated as follows:

Actual spread cost=price bought in leg $A$−price bought in leg $B$

Actual spread cost=100−10

Actual spread cost=90

Based on a slop setting of 20%, the trader is willing to buy the spread within the prices of "8" and "12," which correlates to the market in leg B moving down one price level to "9" or up two price levels to "12." If the order in leg B 612 moves up to a price of "12," and fills, it would result in an actual spread price of "8.33" (8.33=100/12). The actual spread cost would be "88," which results in the trader paying $2 less/unit of the spread, before the leg A order would be re-priced to maintain the desired spread price.

The actual spread cost is calculated as follows:

Actual spread cost=price bought in leg $A$–price sold in leg $B$

Actual spread cost=100–12

Actual spread cost=88

However, if the market in leg B 612 moved down to "9," it would result in an actual spread price of "11.11" (11.11=100/9). The actual spread cost would "91" (e.g., 91=100–9), which results in the trading paying $1 more/unit of the spread, before the leg A order would be re-priced to maintain the desired spread price.

The actual spread cost is calculated as follows:

Actual spread cost=price bought in leg $A$–price sold in leg $B$

Actual spread cost=100–9

Actual spread cost=91

However, if the market in leg B 612 moved just "1" price level further in either direction, or "3" up or "2" down, to a price of "8" or "13," it would result in the actual spread price falling outside the acceptable range. The leg A order would be re-priced to maintain the desired spread price.

In another example, the trader wishes to buy the spread at "4" instead of "10." Currently, the best bid in leg B 612 "10", so an order would be placed at a price of "40" in leg A (e.g., 10=40/10). The actual cost of the spread would be "10."

The trading application uses the same calculation to find the acceptable slop range based on the desired spread price:

Lowest Acceptable Price=desired spread price*(100–slop)/100

3.2=4*(80/100)

Highest Acceptable Price=desired spread price*(100+slop)/100

4.8=4*(120/100)

Based on the slop setting of 20%, the trader is willing to buy the spread within the prices of "3.2" and "4.8." As previously shown, when the order to buy the spread is placed at a price of "10" the acceptable slop range equates to "2" above and below the desired spread price, where 20% of "4" equates to an acceptable slop range of "0.8" above and below the desired spread price. However, regardless of where the desired spread order is placed, the actual cost of the spread will remain within a tolerable difference from the desired cost of the spread. As previously stated, the tolerable difference is defined as the difference in cost associated to the movements in the legs, before the leg order(s) are re-priced. If the market in leg B 612 moves up to a price of "12" and fills, it would result in an actual spread price of "3.33" (e.g., 3.33=40/12). The actual cost of the spread would be "28" (28=40–12). As such, the trader would have paid $2 less/unit of the spread.

However, if the market in leg B 612 move down to a price of 9 and fills, it would result in an actual spread price of "4.4" (4.4=40/9). The actual cost of the spread would be "31" (31=40–9). As such, the trader would have paid $1 more/unit of the spread.

As illustrated, when the desired spread order is placed at a price of "4," the actual spread price can differ from the desired spread price by only "0.8" price values to remain within the 20% acceptable slop range. Whereas when the desired spread order was placed at a price of "10," the actual spread price could differ from the desired spread price by a value of "2" price values, to remain within the 20% acceptable slop range.

However, as shown in the previous examples, regardless of the desired spread price, defining slop as a percentage keeps the actual cost of the spread within a consistent tolerable difference from the desired cost of the spread. Referring back to the examples, when the desired spread order was placed at a price of "10," the trading application consistently only allowed leg B to fluctuate within "2" prices above or "1" price below before the actual spread price fell outside the acceptable slop range of "8" to "12." Specifically, the actual cost of the spread was kept within the tolerable difference of "$1 above or "$2" below, or between "$91" and "$88", when the desired cost of the spread of was "$90." Similarly, when the desired spread order was placed a price of "4," the trading application also kept the price movements in leg B to within "2" price levels above or "1" price level below, before the actual spread price fell outside the acceptable slop range of "3.2" to "4.8." Specifically, the actual cost of the spread was kept within the tolerable difference of "$1 above or "$2" below, or between "$31" and "$28", when the desired cost of the spread of was "$30." Defining slop as a percentage when using the divide spread algorithm, keeps the difference between the actual cost of the spread and the desired cost of the spread within the defined tolerable difference, regardless of where the desired spread order is placed.

CONCLUSION

The example embodiments discussed above describe a method that regulates order entry to maintain an actual cost of a trading strategy. To regulate order entry to maintain an actual cost of a trading strategy according to one example embodiment, the method allows a trader to define an acceptable slop range as a percentage. The method also includes defining a condition to associate with the trading strategy. Using the trading application, the trader can input a desired price to buy or sell the spread, comprising placing an order in one leg market dependent on the market conditions of another leg market. Regardless of the desired spread price to buy or sell the spread, the actual cost of the spread remains within a consistent tolerable difference from the desired cost of the spread. The present invention is not limited in use to a certain type of spread algorithm or to a particular GUI.

A trader will benefit from the consistent tolerable difference between the actual cost of the spread and the desired cost of the spread. A trader will also be able to focus their attention on market conditions, placing new spread orders, and managing their existing spread orders instead of attempting to determine their profits and losses corresponding to each spread order.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, the previously described embodiments are not limited to a particular type of spread trading algorithm or a particular spread definition. It should be understood that although the example embodiments utilized a spread that placed an order to buy leg A and an order to sell leg B, that any variation could be used, such as selling in leg A and buying in leg B. Alternatively, it should be understood that a spread could involve more than two legs, as shown in the example embodiments.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method including:
receiving by a computing device a slop percentage value;
receiving by the computing device a desired strategy price for a trading strategy, wherein the trading strategy includes a first leg for a first tradeable object and a second leg for a second tradeable object;
determining by the computing device an acceptable range of prices for the trading strategy based on the desired strategy price and the slop percentage value such that an actual cost of the trading strategy, when executed, is within a consistent tolerable difference from a desired cost of the trading strategy, regardless of the desired strategy price;
generating by the computing device an order message for an order to trade the first leg with a price based on the desired strategy price and a condition in the second leg;
detecting by the computing device a change in the condition in the second leg; and
determining by the computing device whether the change in the condition in the second leg would cause the actual cost of the trading strategy, if executed, to fall outside of the acceptable range of prices and, if so, re-pricing the order to trade the first leg to maintain the desired strategy price, and, if not, refraining from re-pricing the order to trade the first leg.

2. The method of claim 1, wherein the slop percentage value is received from a user.

3. The method of claim 1, wherein the desired strategy price is received from a user.

4. The method of claim 1, wherein the trading strategy is a spread.

5. The method of claim 1, wherein the trading strategy is a divide spread.

6. The method of claim 1, wherein the acceptable range of prices includes a lowest acceptable price and a highest acceptable price.

7. The method of claim 6, wherein determining the acceptable range of prices includes:
determining the lowest acceptable price using the following relationship: lowest acceptable price=desired strategy price*(100−slop percentage value)/100; and
determining the highest acceptable price using the following relationship: highest acceptable price=desired strategy price*(100+slop percentage value)/100.

8. The method of claim 6, wherein the slop percentage value includes a low slop percentage value and a high slop percentage value, wherein the low slop percentage value is different from the high slop percentage value.

9. The method of claim 8, wherein determining the acceptable range of prices includes:
determining the lowest acceptable price using the following relationship: lowest acceptable price=desired strategy price*(100−low slop percentage value)/100; and
determining the highest acceptable price using the following relationship: highest acceptable price=desired strategy price*(100+high slop percentage value)/100.

10. The method of claim 1, wherein the price of the order to trade the first leg is determined based on the desired strategy price and the condition in the second leg according to a trading strategy definition.

11. The method of claim 1, wherein the condition is a current price at the inside market.

12. A non-transitory computer readable medium having stored therein instructions executable by a processor, wherein the instructions are executable to:
receive a slop percentage value;
receive a desired strategy price for a trading strategy, wherein the trading strategy includes a first leg for a first tradeable object and a second leg for a second tradeable object;
determine an acceptable range of prices for the trading strategy based on the desired strategy price and the slop percentage value such that an actual cost of the trading strategy, when executed, is within a consistent tolerable difference from a desired cost of the trading strategy, regardless of the desired strategy price;
generate an order message for an order to trade the first leg with a price based on the desired strategy price and a condition in the second leg;
detect a change in the condition in the second leg; and
determine whether the change in the condition in the second leg would cause the actual cost of the trading strategy, if executed, to fall outside of the acceptable range of prices and, if so, re-price the order to trade the first leg to maintain the desired strategy price, and, if not, refrain from re-pricing the order to trade the first leg.

13. The computer readable medium of claim 12, wherein the slop percentage value is received from a user.

14. The computer readable medium of claim 12, wherein the desired strategy price is received from a user.

15. The computer readable medium of claim 12, wherein the trading strategy is a spread.

16. The computer readable medium of claim 12, wherein the trading strategy is a divide spread.

17. The computer readable medium of claim 12, wherein the acceptable range of prices includes a lowest acceptable price and a highest acceptable price.

18. The computer readable medium of claim 17, wherein the instructions to determine the acceptable range of prices include instructions executable to:

determine the lowest acceptable price using the following relationship: lowest acceptable price=desired strategy price*(100−slop percentage value)/100; and determine the highest acceptable price using the following relationship: highest acceptable price=desired strategy price*(100+slop percentage value)/100.

19. The computer readable medium of claim 17, wherein the slop percentage value includes a low slop percentage value and a high slop percentage value, wherein the low slop percentage value is different from the high slop percentage value.

20. The computer readable medium of claim 19, wherein the instructions to determine the acceptable range of prices include instructions executable to:

determine the lowest acceptable price using the following relationship: lowest acceptable price=desired strategy price*(100−low slop percentage value)/100; and determine the highest acceptable price using the following relationship: highest acceptable price=desired strategy price*(100+high slop percentage value)/100.

21. The computer readable medium of claim 12, wherein the price of the order to trade the first leg is determined based on the desired strategy price and the condition in the second leg according to a trading strategy definition.

22. The computer readable medium of claim 12, wherein the condition is a current price at the inside market.

* * * * *